Figure 1:
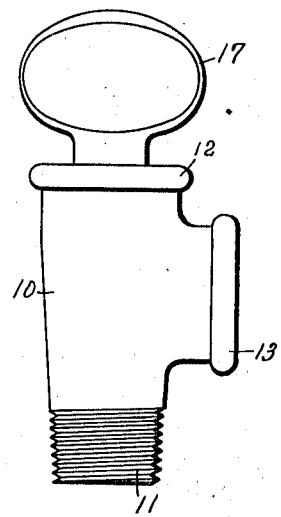

P. MUELLER.
SERVICE T.
APPLICATION FILED AUG. 8, 1910.

992,975.

Patented May 23, 1911.

Witnesses
Chester W. Hathaway.

Inventor
Philip Mueller,
by Meyers, Cushman & Rea
Attorney.

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

SERVICE-T.

992,975.

Specification of Letters Patent.  Patented May 23, 1911.

Application filed August 8, 1910. Serial No. 576,160.

*To all whom it may concern:*

Be it known that I, PHILIP MUELLER, a citizen of the United States, residing at Decatur, in the county of Macon and State of Illinois, have invented new and useful Improvements in Service-T's, of which the following is a specification.

My invention relates particularly to one form of pipe fittings, to wit, a service T for making connections to gas or other fluid mains though, as will appear hereinafter, it may well be applied to other forms of fittings.

In making connections to a main, a service clamp is applied to the main, a service T is threaded into the tapper boss of the clamp, and then a drilling machine is used to tap the main, the machine being applied to the T, and the drill operating through its alined branches. After the main has been tapped and the drill removed, a considerable rush of gas or other fluid from the main takes place if the service fitting is not provided with means for closing the outlet before the drill is entirely removed. If plugs are used a great rush of fluid takes place when they are removed and the proper attachment of a branch pipe from the outlet is interfered with, if not prevented entirely. Particularly is this true in the case of gas mains, and when the main is tapped and the workmen have to apply the fittings at the bottom of the rather deep excavation thus exposing themselves to the escaped gas which is confined within the excavation within which they are working.

Before the drilling operation, the side opening of the service T, or the opening for the service, must be plugged up so as to prevent the gas from escaping while drilling, and after the hole is drilled, the machine, together with the drill, is removed from the service T and the stopper or plug is quickly screwed into the service T to shut off the gas. This having been done the side plug is removed and the service pipes installed. After the service pipes have been installed the stopper, or plug which had been inserted after the drilling, is removed and is replaced by a regular plug for the top of the service T, thus leaving the full opening for the passage of gas into the service T from the main, through the service T and into the service pipes. In other words, the plug or stopper inserted into the service T functions to prevent the gas escaping during the installation of the service pipes, thus preventing the workmen from being overcome by gas. Various means for stopping this flow of gas have been devised and used by plumbers, such for instance, as the stopping of a T with earth, or with a packing which is removed by a suitable tool, after the branch connection has been made. None of these methods are satisfactory, as their use often results in only a partial stoppage in the flow of gas, and in most instances introduces foreign matter into the connections, which remains there to be carried into the branch connection when that connection is established and put in use. Besides impeding the flow of fluid through the pipes, this foreign matter, particularly in gas and water pipes, is very likely to be carried along with the moving fluid and to clog at some small bend or at some small branch connection. Wooden plugs, are also very frequently used, but they are open to the objection that they leak, being often cut irregularly by the fitter himself, and to the objection that when the pressure on the main is high, they sometimes are forced out, flooding everything with water before they can be replaced. The attachment of a service T or similar fitting is thus often attended with considerable annoyance due to these troubles.

It is the object of my invention to make a service T which can be readily attached without these annoyances. I accomplish this by a simple but effective method of forming a seat within the fitting and just beyond the inlet opening thereto, and providing a special form of plug to fit the seat and stop the inlet opening. In the service T there are three openings, an inlet, an outlet, and a drill opening, which latter is usually in a right line with the inlet. I prefer to form the entire seat on the same right line as the inlet and drill opening, and insert the plug from the drill opening, providing it with a long stem or handle so that it may be easily manipulated from the outside.

Figure 2:
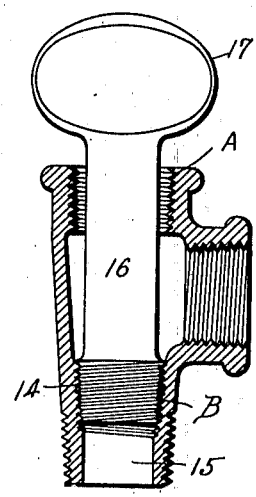
Figure 3:
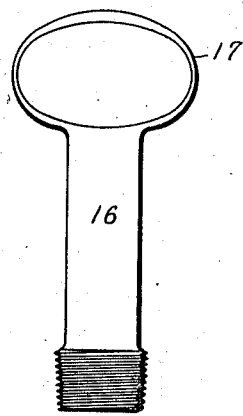
Figure 5:
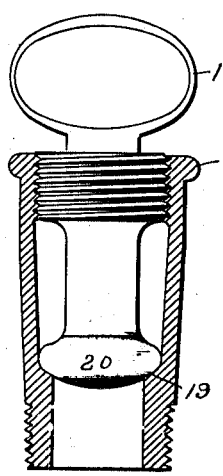
Figure 4:
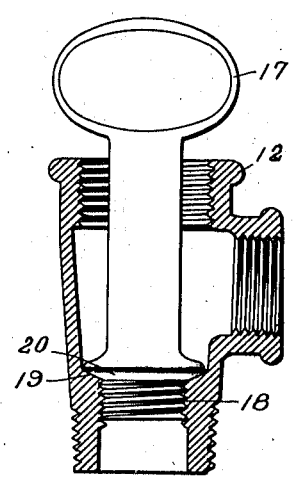

My invention will be clearly understood, and its advantages more fully realized from the following description taken in connection with the accompanying drawings, in which, Figure 1 is a side elevation of my invention applied to a serivce T. Fig. 2 is a sectional elevation of the same, and Fig. 3 is a view of the plug which constitutes an element of my invention. Figs. 4 and 5 are central sections of modifications.

Referring to the drawing, 10 is the body of the service T, which has an inlet 11, a drill hole 12 in a right line therewith, and an outlet 13 at an angle thereto. The inlet 11 is exteriorly screw-threaded for the insertion into the tapped main, while the drill opening 12 is interiorly screw-threaded, as shown, for the attachment of a drilling apparatus and subsequent insertion of a standard pipe plug to close the opening after the drilling operation. The outlet 13 is interiorly screw-threaded for the attachment of the branch or service connection.

On the interior of the inlet I form a tapering seat 14, terminating it short of the mouth 15 of the inlet. Preferably I thread this seat 14, the threads being of the same extent as the seat.

16 is a plug member which has its lower end shaped and screw-threaded to fit the seat 14, while its upper end is provided with an operating handle 17.

In use my invention is manipulated as follows: After the drilling, and after the drill has been removed, the plug member 16 is inserted through the drill opening, and the plug is then screwed home. By reason of the fact that the seat is tapering and of the fact that the seat and its screw-threads terminate short of the mouth of the inlet, the plug always makes a tight closure of the opening, and is prevented from being entered so far as to pass it entirely through the inlet and into the main, in which case, of course, leakage would result, and the plug might be hard to withdraw. The handle 17 is of ample proportions and the plug may be firmly screwed in. The flow of fluid through the connection being thus effectually stopped the branch connection may be attached readily and without annoyance, as much time being taken for the attachment of it as is necessary to properly do so, and to run the branch connection to the point desired. Thereafter the plug member 16 may be removed and a standard pipe plug inserted in the drill opening 12 to close the opening. The branch connection is then ready for service.

My invention as thus proposed has been found most efficient and useful in practice. The plug member 16 is an addition to the plumber's kit of tools which he frequently finds occasion to use. With service T's made in accordance with my invention, their attachment to the service main is greatly simplified and a source of trouble, heretofore proven most vexatious to plumbers, avoided. When several taps are to be made by gas companies they regularly employ special men for that specific purpose and these men are often known as "tappers". After the taps have been made, the gas fitter connects the service pipes to the service T. With the aid of my invention, several taps can be made and the pressure shut off at the service T's, thus permitting the tapper to go away from the job after having inserted the plug 16 into the service T's, thus leaving the fitters to complete the installation of the service connections, at their convenience without detaining the tapper. It may also be noted that since the use of high pressure gas, this makes a helpful, convenient and safe gas fitting. The manufacture of service T's with the especially formed seat inside of the inlet is not much more expensive than the manufacture of the standard T as now made. In fact the increased cost of manufacture will be practically negligible. The plug member 16 constitutes an addition to the plumber's kit, and is likewise inexpensive as it can be made of cast iron and comparatively light. As standard service T's are for the most part of one size it will be necessary to carry at most only two or three of these plug members. It is thus evident that my invention finds a wide practical range of use, and is most valuable for the purpose intended.

In Figs. 4 and 5 I show two modifications of my invention. That of Fig. 4 consists in forming the screw threads of the plug and seat straight instead of tapering and forming the seat separate from and above the screw threaded portion. 18 designates the screw threaded portion, 19 the tapered valve seat and 20 the tapered portion of the plug coöperating therewith. That of Fig. 5 differs from Fig. 4 in that the straight threaded portion is not associated with the seat portion, but is on the upper part of the stem of the plug and engages the outer end of the casing. The seat and lower coöperating end of the plug are roundingly tapered as shown. This permits easy alinement.

While I have illustrated the best form of my invention now known to me, it is obvious that many modifications may be made in the specific embodiment of my invention without departing from its generic spirit. Thus the form and proportions of the character of the seat and plug may be varied to suit various conditions. For instance, for low pressure the seat and plug may be formed tapering and without screw-threads, the seat being ground or accurately cut a standard size which the plug will accurately fit.

Many other changes will suggest themselves to the skilled mechanic, and all such modifications I desire to cover in the annexed claims.

What I claim is:

1. A service T having an inlet, an outlet, and a drill opening on a right line with said inlet, and a tapering plug seat formed inside said inlet and tapering toward the mouth of the same, the axis of said seat coinciding with the right line of the inlet and drill opening, and a plug member tapered correspondingly to said seat to fit the same, and having a shank adapted to extend through the drill opening and clear of the casing, said plug member being adapted to be removed through said drill opening.

2. A service T having an inlet, an outlet and a drill opening on a right line with said inlet, and a tapering screw-threaded plug seat formed inside said inlet, and tapering toward the mouth of said inlet and terminating short of the same, the axis of said seat coinciding with the right line of the inlet and drill opening, and a plug member having a portion tapered and threaded correspondingly to said seat, and having a shank adapted to extend through the drill opening and clear of the casing, said drill opening and casing being adapted to permit the ready removal of the plug member through the drill opening.

3. A service T having an inlet, an outlet and a drill opening on a right line with said inlet, and a tapering screw-threaded plug seat formed inside said inlet, and tapering toward the mouth of said inlet and terminating short of the same, the axis of said seat coinciding with said right line of the inlet and drill opening, in combination with a plug member formed and screw-threaded to fit said seat, and having a shank adapted to extend through the drill opening and clear of the casing, and a handle on the end of the shank, the said casing being adapted to permit the ready removal of the said plug member through the drill opening.

In testimony whereof I have hereunto set my hand in presence of two subscribing witnesses.

PHILIP MUELLER.

Witnesses:
LEONARD F. McKIBBEN,
WILLIAM R. BIDDLE.